(12) United States Patent
Boxwell et al.

(10) Patent No.: US 11,403,522 B2
(45) Date of Patent: Aug. 2, 2022

(54) TRAINING ARTIFICIAL INTELLIGENCE TO USE ANSWER PASSAGE MERGING FOR FULL SENTENCES RESPONSES IN A QUESTION ANSWERING SYSTEM

(71) Applicant: International Business Machines Corporation, Armonk, NY (US)

(72) Inventors: Stephen A. Boxwell, Franklin, OH (US); Kyle M. Brake, Dublin, OH (US); Keith G. Frost, Delaware, OH (US); Stanley J. Vernier, Grove City, OH (US)

(73) Assignee: International Business Machines Corporation, Armonk, NY (US)

( * ) Notice: Subject to any disclaimer, the term of this patent is extended or adjusted under 35 U.S.C. 154(b) by 583 days.

(21) Appl. No.: 16/502,908

(22) Filed: Jul. 3, 2019

(65) Prior Publication Data

US 2021/0004673 A1    Jan. 7, 2021

(51) Int. Cl.
| | |
|---|---|
| *G06N 3/08* | (2006.01) |
| *G06N 5/04* | (2006.01) |
| *G06N 3/04* | (2006.01) |
| *G06F 40/56* | (2020.01) |
| *G06F 40/35* | (2020.01) |

(52) U.S. Cl.
CPC .............. *G06N 3/08* (2013.01); *G06F 40/35* (2020.01); *G06F 40/56* (2020.01); *G06N 3/0427* (2013.01); *G06N 5/04* (2013.01)

(58) Field of Classification Search
CPC ................ G06F 40/35; G06F 40/56
USPC ............................................................. 704/9
See application file for complete search history.

(56) References Cited

U.S. PATENT DOCUMENTS

| | | |
|---|---|---|
| 8,738,362 B2 | 5/2014 | Ferrucci et al. |
| 9,092,989 B2 | 7/2015 | Agarwal et al. |
| 9,773,044 B2 | 9/2017 | Dubbels et al. |
| 10,133,808 B2 | 11/2018 | Brown et al. |
| 10,147,051 B2 | 12/2018 | Beller et al. |

(Continued)

OTHER PUBLICATIONS

Reflexive Hybrid Approach to Provide Precise Answer of User Desired Frequently Asked Question, Aayushi Verma Department of computer science engineering Jaypee Institute of Information Technology, 978-1-5090-3519-9/17/$31.00 c 2017 IEEE (Year: 2017).*

(Continued)

*Primary Examiner* — Bharatkumar S Shah
(74) *Attorney, Agent, or Firm* — Law Office of Jim Boice

(57) ABSTRACT

A method trains and utilizes an artificial intelligence (AI) system. The AI system receives a question that has contextual features. The method trains the AI system to identify entries in a corpus that have one or more of the contextual features from the question. The method further trains the AI system to: form a set of answers to the question based on identified contextual entries in the corpus; identify and name an entry in the corpus that has a highest quantity of contextual features that match the contextual features in the question as an initial answer to the question; identify and merge multiple other answers to the question from the corpus; and replace the initial answer with the merged answer in order to create a fully trained AI system. The fully trained AI system is then utilized to answer the question with the merged answer.

20 Claims, 8 Drawing Sheets

(56) References Cited

U.S. PATENT DOCUMENTS

| | | | | |
|---|---|---|---|---|
| 10,963,493 B1* | 3/2021 | Hu | ............... | G06N 5/041 |
| 2016/0071432 A1* | 3/2016 | Kurowski | ............... | G16H 20/30 |
| | | | | 434/236 |

OTHER PUBLICATIONS

Reflexive Hybrid Approach to Provide Precise Answer of User Desired Frequently Asked Question, Aayushi Verma Department of computer science engineering Jaypee Institute of Information Technology, 978-1-5090-3519-9/17/$31.00 c 2017 IEEE (Year: 2017) (Year: 2017).*

G. -S. Pirtoacă, T. Rebedea and . Ruei, "Improving Retrieval-Based Question Answering with Deep Inference Models," 2019 International Joint Conference on Neural Networks (IJCNN), 2019, pp. 1-8, doi: 10.1109/IJCNN.2019.8851826. (Year: 2019).*

P. Mell et al., "The NIST Definition of Cloud Computing", National Institute of Standards and Technology, Information Technology Laboratory, Sep. 2011, pp. 1-7.

Le Juan et al., "Answer Extraction Based on Merging Score Strategy of Hot Terms" Chinese Journal of Electronics, vol. 25, No. 4, Jul. 2016, pp. 614-620.

V. Lopez et al., "Merging and Ranking Answers in the Semantic Web: The Wisdom of Crowds", ASWC 2009. Lecture Notes in Computer Science, vol. 5926. Springer, Berlin, Heidelberg, pp. 1-15.

* cited by examiner

WHAT COUNTRIES BORDER FRANCE? — 202

| COUNTRY | MATCHING PASSAGE CONTEXT FEATURE INDICIA VECTORS |
|---|---|
| UNITED STATES | 1100 |
| GERMANY | 0100 |
| BELGIUM | 0010 |
| SPAIN | 0001 |

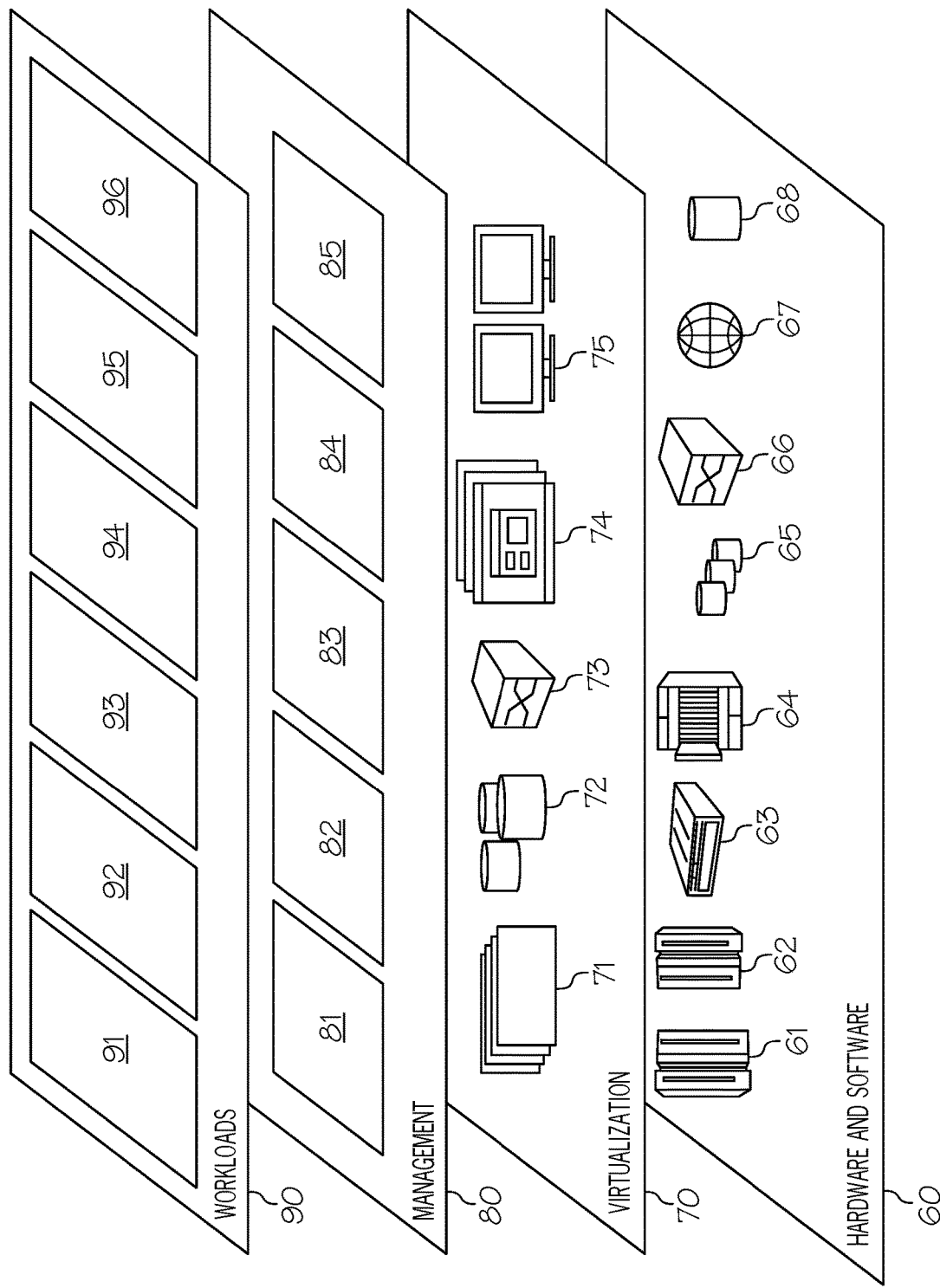

US 11,403,522 B2

TRAINING ARTIFICIAL INTELLIGENCE TO USE ANSWER PASSAGE MERGING FOR FULL SENTENCES RESPONSES IN A QUESTION ANSWERING SYSTEM

BACKGROUND

The present invention relates to the field of question answering systems. Still more specifically, the present invention relates to the field of training an artificial intelligence to merge answers in order to create a merged answer to a question.

SUMMARY

In an embodiment of the present invention, a method trains and utilizes an artificial intelligence (AI) system. The AI system receives a question that has contextual features. The method trains the AI system to identify entries in a corpus that have one or more of the contextual features from the question. The method further trains the AI system to: form a set of answers to the question based on identified contextual entries in the corpus; identify an entry in the corpus that has a highest quantity of contextual features that match the contextual features in the question; name the entry in the corpus that has the highest quantity of contextual features that match the contextual features in the question as an initial answer to the question; identify multiple answers to the question, wherein the multiple answers exclude the initial answer, and wherein each of the multiple answers has fewer contextual features that match the contextual features in the question than the initial answer; merge the multiple answers into a merged answer to the question; identify merged answers that have a total quantity of contextual features that exceed the contextual features in the initial answer; and replace the initial answer with the merged answer in order to create a fully trained AI system. The fully trained AI system is then utilized to answer the question with the merged answer.

In an embodiment of the present invention, the AI system modifies a hardware device based on the answer that is identified by a neural network.

In one or more embodiments, the method(s) described herein are performed by an execution of a computer program product and/or a computer system.

BRIEF DESCRIPTION OF THE DRAWINGS

FIG. 2 illustrates an exemplary question and matching feature indicia in answers from a corpus;

FIG. 8 depicts abstraction model layers of a cloud computer environment according to an embodiment of the present invention.

DETAILED DESCRIPTION

Figure 1:
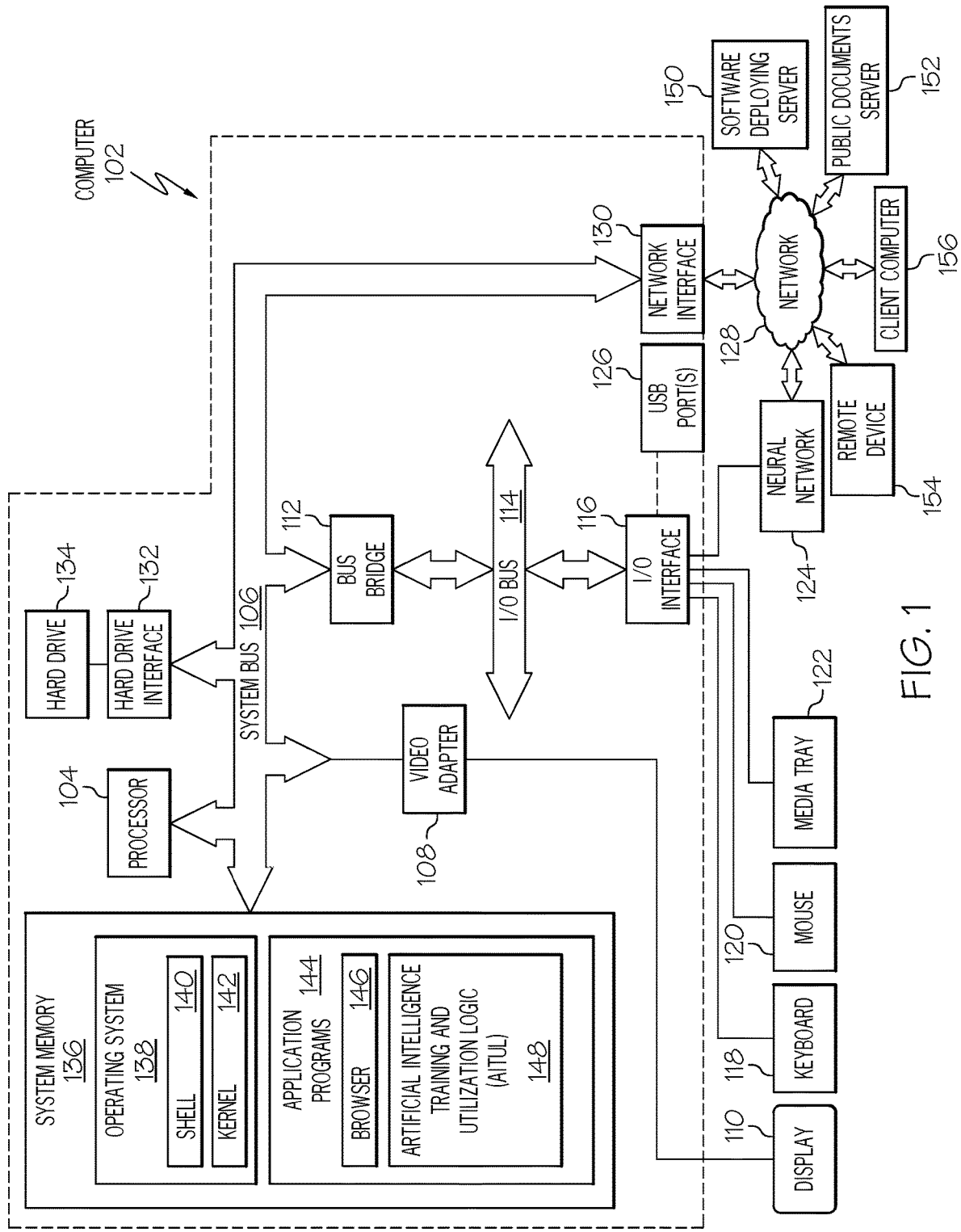
FIG. 1 depicts an exemplary system and network in which the present invention may be implemented.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device to implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or public documents server 152 and/or remote device 154 and/or client computer 156 and/or neural network 124.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a neural network 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 and/or the public document server 152 and/or the remote device 154 and/or the neural network 124 using a network interface 130 to a network 128. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include an Artificial Intelligence Training and Utilization Logic (AITUL) 148. AITUL 148 includes code for implementing the processes described below, including those described in FIGS. 2-6. In one embodiment, computer 102 is able to download AITUL 148 from software deploying server 150, including in an on-demand basis, wherein the code in AITUL 148 is not downloaded until needed for execution. Note further that, in one embodiment of the present invention, software deploying server 150 performs all of the functions associated with the present invention (including execution of AITUL 148), thus freeing computer 102 from having to use its own internal computing resources to execute AITUL 148.

Also connected to (or alternatively, as part of) computer 102 is a neural network 124. In exemplary embodiments of the present invention, neural network 124 is a deep neural network (see FIGS. 4-5), a convolutional neural network, or another type of heuristic artificial intelligence.

Also connected to computer 102 is a public document server 152, which serves documents that are available to the public. Examples of documents that are served by public document server 152 include, but are not limited to, public forum messages, social media messages, academic paper repositories, news reports generated by the mass media (e.g., newspapers, magazines, electronic news services, etc.), etc.

Also connected to computer 102 is a remote device 154. One or more examples of remote device 154 are presented in FIG. 3.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

In the question-answering task, questions are transformed into short factoid answers. In practical applications, however, it is desirable to return to the user a short passage from the source material. For example, in the question "What countries border France?", a user often will prefer to obtain a response like "Spain, Belgium, Germany, and several other countries share a border with France". A single-answer question answering system might list "Spain", "Belgium", and "Germany" as the three possible. However, a single passage that produced these three answers would be a superior response.

As described herein, one or more embodiments of the present invention generates equivalence classes of answers based on the passages that support them. These equivalence classes are then passed to an alternate answer-merger step, which merges the features of each answer into merged answers, thus combining the evidence of each answer such that it appears in the same passage. This permits each passage to be accurately evaluated against each other passage.

With reference now to FIG. 2, assume that a question answering (QA) system (e.g., computer 102 shown in FIG. 1) receives the question shown in block 202 ("What countries border France"?) from a user, such as a user of the client computer 156 shown in FIG. 1.

Assume further that the question answering system provides the following answers in order of ranking/preference: 1. United States; 2. Germany; 3. Belgium; 4. Spain.

In this case, the question answering system chose the wrong answer, since the United States does not border France. However, this error came from the question answering system retrieving the following passages from the public documents server 152 shown in FIG. 1. These passages are:

Passage 1: "There are a number of countries that share fruitful trade relationships with the United States that border France."

Passage 2: "Germany is a nice place to visit that borders France."

Passage 3: "Belgium is a nice country next to France."

Passage 4: "Spain is by France."

As shown in table 204 in FIG. 2, each of these passages include context features, which are indicated by the matching passage context feature indicia vectors 206.

A context feature is defined herein as a textual structure of a passage. Examples of context features include, but are not limited to, n-grams, Levenshtein similarity, term frequency-inverse document frequency (TF-IDF), Jaccard similarity, cosine similarity, and parts of speech.

An n-gram is a set of words. Thus, a 1-gram is a single word (e.g., "dog"), a 2-gram is a pair of words that appear together (e.g., "big dog"), a 3-gram is a set of three words that appear together (e.g., "big red dog"), etc. Thus, a question and a passage from a corpus that is being examined to answer the question can share one or more n-grams in order to deem the passage as being a candidate for answering the question. More n-grams shared between the question and a passage mean that the passage is a better candidate for answering the question than a passage that shares fewer n-grams with the question.

A Levenshtein similarity is the number of changes that must be made to a word to create a new word. For example, assume that the word "countries" is found in the question. If the word "county" is found in a candidate passage from the corpus, then it takes five edits to go from "countries" to "county" (1. Remove "s" from "countries"; 2. Remove "e" from "countrie"; 3. Remove "i" from "countri; 4. Remove "r" from "countr"; 5. Add "y" to "count".) However, if the word "country" is found in a candidate passage from the corpus, then it only takes three edits to go from "countries" to "country" (1. Remove "s" from "countries"; 2. Remove "e" from "countrie"; 3. Replace the "i" in "country with a "y".) Thus, this passage has a closer Levenshtein similarity to the question, and is a better candidate for answering the question.

A term frequency—inverse document frequency (TF-IDF) relationship essentially identifies rare words that are in both the question and a candidate passage for answering the question. That is, the word "border" is found in the question and this word is much less common that "country". As such, if a passage also includes the term "border", then it is weighted heavily as a promising candidate for answering the question.

A Jaccard similarity describes text overlap found in both the question and the candidate passage for answering the question. For example, if the question includes the terms A, B, C, D, and a first passage includes the terms A, B, C, and E, then the Jaccard similarity is a ratio of the terms that are found in both the question and the first passage (A, B, C) to terms that are found in either the question or the first passage (A, B, C, D, E). Assume that each term has a value of "1", then the ratio of A, B, C to A, B, C, D, E is 3:5. Assume now that a second passage includes the terms A, B, and E, then the Jaccard similarity is a ratio of the terms that are found in both the question and the second passage (A, B) to terms that are found in either the question or the second passage (A, B, E), and assuming that each term has a value of "1", then the ratio of A, B to A, B, E is 2:3. Since the ratio 2:3 (0.66) is greater than the ratio 3:5 (0.60), then the second passage is a better candidate for answering the question.

A cosine similarity uses a dot product of text vectors between the question and a passage to determine their similarity. That is, if the question and the passage share the exact same terms, then the angle between them is zero, and the cosine of zero is 1. At the other extreme, if the question and the passage share no terms, then the angle between is 90 degrees, and the cosine of 90 degrees is zero. Thus, passages with a higher cosine similarity are better candidates for answering the question than passages with relatively lower cosine similarities.

Parts of speech are defined as categories to which words are assigned in accordance with their syntactic functions. Exemplary parts of speech are noun, pronoun, adjective, determiner (e.g., articles such as "a", possessives such as "your", demonstratives such as "this", numerals such as "two", ordinals such as "first", quantifiers such as "another"), verb, adverb, preposition, conjunction, and interjection. Thus, if the question has a certain percentage breakout of parts of speech that are close the percentage of parts of speech in a particular passage, then that particular passage is deemed to be a good candidate for answering the question. That is, if the question is 20% nouns, 10% pronouns, 20% adjectives, 25% demonstratives, 8% verbs, 2% adverbs, 5% prepositions, 10% conjunctions, and 0% interjections, then a passage that has these same parts of speech percentages is deemed to be a good candidate answer, since the structures of the passages are so similar (implying a high likelihood that the question and the passage are related to a same topic).

Returning now to FIG. 2, assume for explanatory purposes that each of the matching passage context feature indicia vectors 206 for passages from the corpus follow the format of "abcd", where "a" represents whether (1) or not (0) the passage includes the word "country", which is also found in the question; "b" represents whether a passage shares more than a predetermined quantity of n-grams with the question; "c" represents whether a term frequency-inverse document frequency (TF-IDF) for rare terms in both the question and the passage exceed a certain value; and "d" represents whether a passage has terms that have a cosine similarity with the question that exceeds a certain value.

As shown in FIG. 2, passage 1 (United States) has a context feature indicia vector of 1100, since it shares the n-gram "country" and includes the rare word "border" (TF-IDF factor). Passage 2 (Germany) has a context feature indicia vector of 0100, since it also has the term "border" (TF-IDF factor). Passage 3 (Belgium) has a context feature indicia vector of 0010, since "countries" from the question and "country" from passage 3 has a high Levenshtein similarity. Passage 4 (Spain) has a context feature indicia vector of 0001, since it has a Jaccard similarity ratio of 1:8 with the question, which is over a predetermined ratio (e.g., 1:10).

Initially, it appears just from the matching passage context feature indicia vectors 206 that Passage 1 (United States) provides the best answer ("There are a number of countries that share fruitful trade relationships with the United States that border France.") to the question "What countries border France?", even though it is incorrect.

However, by combining the matching passage context feature indicia vectors 206 from Passages 2-4, then the combined matching passage context feature indicia vectors 206 is now "0111", indicating that these three passages provide the best match to the question. As such, these three passages are combined to create the answer "Germany, Belgium, and Spain are all nice places to visit that border France."

Thus, the combination of the three correct answers (Germany, Belgium, and Spain) are combined to boost the answer "Germany, Belgium, and Spain are all nice places to visit that border France." to the number one position (over "There are a number of countries that share fruitful trade relationships with the United States that border France.")

As described herein, an artificial intelligence (AI) system will, after being properly trained, learn how to combine passages based on their matching passage context feature indicia vectors 206 in order to answer the question. In one or more embodiments of the present invention, this leads to the automatic control of one or more physical devices.

Figure 3:
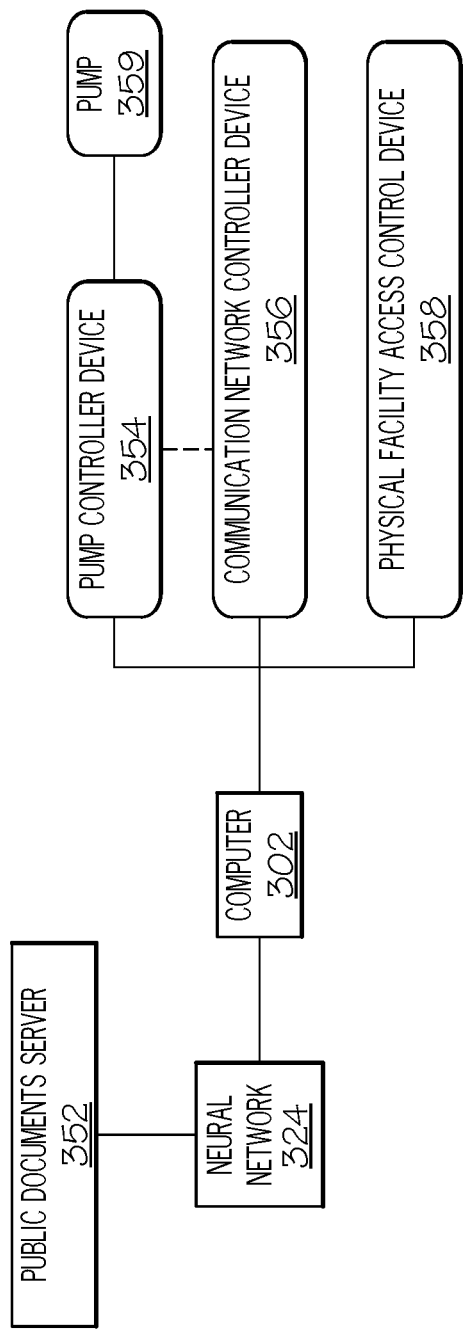
FIG. 3 depicts a connective relationship between a controlling computer and one or more control devices used in one or more embodiments of the present invention.

For example, and as shown in FIG. 3, assume that computer 302 (analogous to computer 102 shown in FIG. 1) and/or neural network 324 (analogous to neural network 124 shown in FIG. 1 and/or trained deep neural network 524 shown in FIG. 5) have determined that a correct answer from the public documents server 352 (which serves a corpus of documents and/or other information) describes anomalous operating conditions for a pump 359. For example, assume that the nominal operating temperature of pressure vessel 359 is 50° F., but a document in the corpus (e.g., a report typed in by an operator in a refinery) states that the current temperature of this pressure vessel 359 is 100° F. Assume further that the nominal speed of the pump 359 is 3000 rpm, but a document in the corpus (e.g., a report typed in by an operator in a refinery) states that the current speed of this pump 359 is 5000 rpm. Assume further that the nominal pressure generated by the pump 359 is 125 psi, but a document in the corpus (e.g., a report typed in by an operator in a refinery) states that the current pressure generated by the pump 359 is 200 psi.

If the QA system is asked the question "Is pump 359 running okay?", the QA system can provide an initial answer "Pump 359 is hardly okay", which by itself has a high matching passage context feature indicia vectors 206 for the question. However, assume that the three documents in the corpus described above each have a feature that make them related to the question. Taken alone, each feature is not enough to replace the answer "Pump 359 is hardly okay" with a combined answer of "The current temperature of pressure vessel is 100° F., the current speed of pump 359 is 5000 rpm, and the current pressure generated by pump 359 is 200 psi, all of which are well above nominal ranges." However, this "merged answer" has a higher matching passage context feature indicia vectors 206 than the initial answer "Pump 359 is hardly okay", and thus is provided as the answer to the question, which results in an automatic adjustment of pump 359.

For example, and in an embodiment of the present invention, the computer 302 directs a pump controller device 354 (analogous to remote device 154 shown in FIG. 1) to take steps to slow down the pump 359, in order to reduce its temperature and the level of pressure it is generating.

In an embodiment of the present invention, assume that a communication network controller device 356 (also analogous to remote device 154 shown in FIG. 1) controls a communication network (e.g., network 128 shown in FIG. 1, but not shown in FIG. 3) between computer 302 and pump controller 354. That is, in order for remote instructions to be sent from computer 302 to pump controller device 354, communication network controller device 356 activates the network between the computer 302 and the pump controller device 354 in response to the computer 302 receiving the merged document (created by the neural network 324) indicating that the pump 359 is running too fast, and in response to the computer 302 sending a communication network activation signal to the communication network controller device 356. This allows the computer 302 to remotely direct the pump controller device 354 to take steps to slow down the pump 359.

In an embodiment of the present invention, assume that a physical facility access control device 358 (also analogous to remote device 154 shown in FIG. 1) controls locks on doors, movable bollards, barricades, gates, etc. that control access to the pump 359. Thus, if the reported temperature/pressure/speed of the pump 359 is high enough to potentially cause a catastrophic failure of the pump 359, then access to the pump 359 is opened (if enough time is available to safely take care of the problem) or closed (if failure is imminent), thus protecting workers in the area.

In one or more embodiments, the present invention uses an electronic neural network, such as the neural network 124 shown in FIG. 1, to identify a passage that answers a particular question, whose answer can be used to control a particular device, provide information to a user, etc.

In various embodiments of the present invention, the neural network 124 shown in FIG. 1 is a Deep Neural Network (DNN), a Convolutional Neural Network (CNN), and/or another type of machine learning system. In a preferred embodiment, a DNN is used to evaluate text/numeric corpuses looking for an answer to a question, while a CNN is used to evaluate image corpuses that can answer a particular question.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are only "excitatory" to varying degrees.

In a DNN, neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often a single node for holding vector information.

Figure 4:
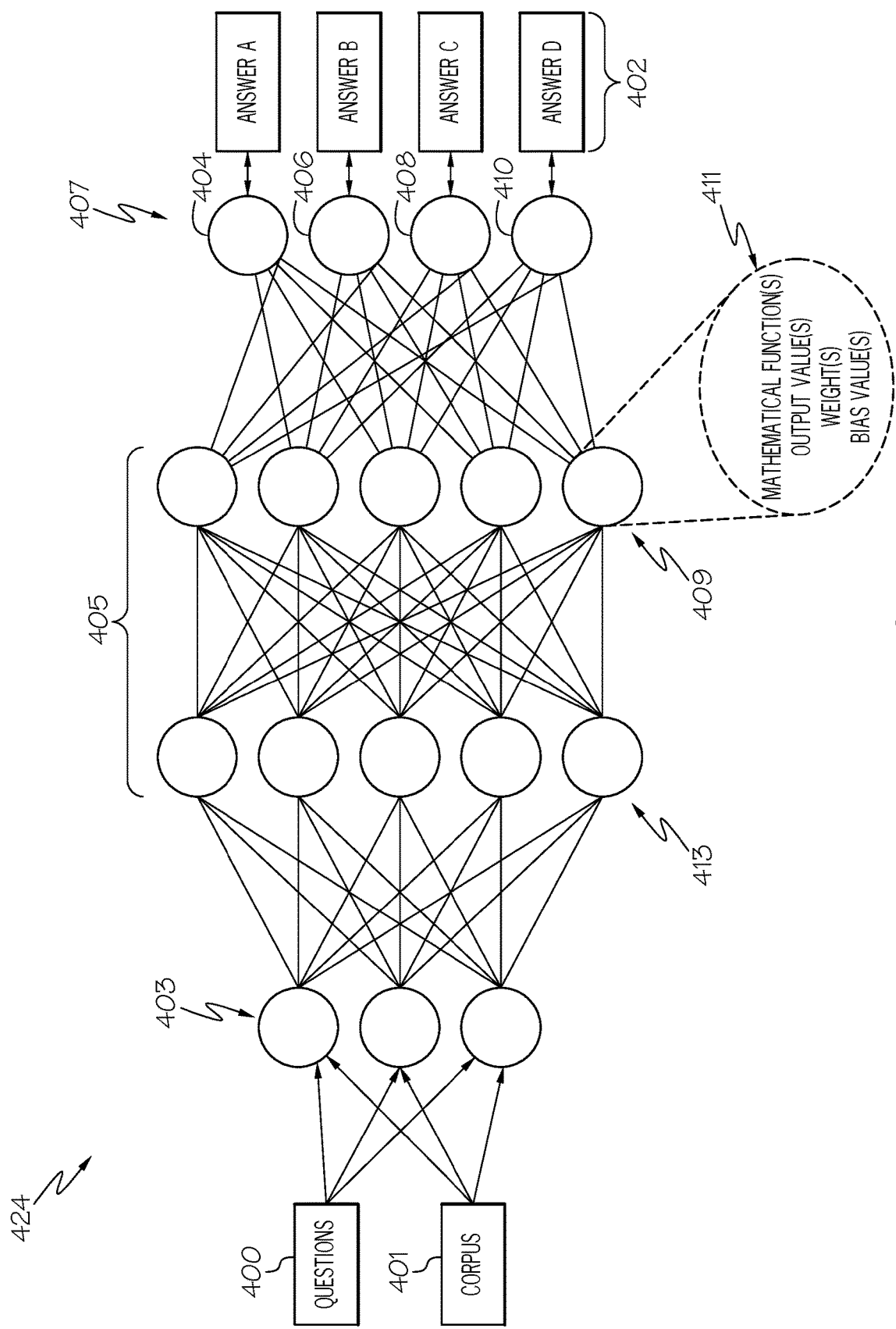
FIG. 4 depicts an exemplary deep neural network as used in one or more embodiments of the present invention.
Figure 5:
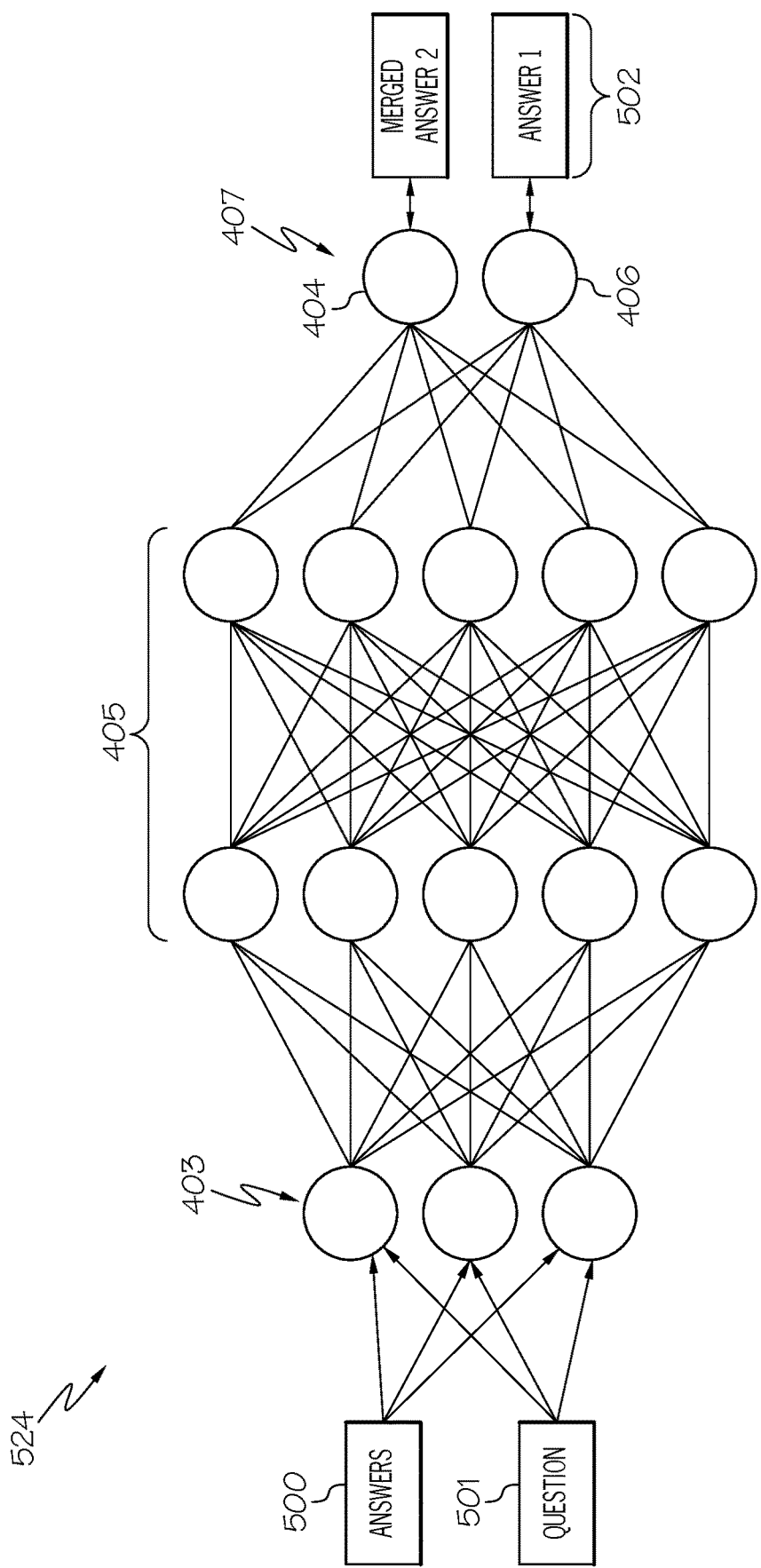
FIG. 5 illustrates an exemplary trained deep neural network as used in one or more embodiments of the present invention.

With reference now to FIG. 4, a Deep Neural Network (DNN) 424 being trained to generate answers to a specific type of question based on passages in documents from a corpus 401 (e.g., a collection of documents, sensor readings, etc.) is presented. FIG. 5 depicts trained DNN 524 being used to generate a merged answer from the answers created from the DNN 424 shown in FIG. 4.

For example, and with reference to FIG. 4, assume, for illustrative purposes, that questions 400 are questions that ask various forms of the question "What temperature is the interior temperature of the pressurized vessel today?" from the domain of chemical refining. Such variations could include questions such as "What in the internal temperature of the pressure vessel now?"; "How hot is the pressurized vessel?"; "What is the current temperature of the pressurized vessel?"; "What is the internal temperature in the tank today?"; etc. As such, some of the questions 400 include the token (word, term, phrase) "temperature" but not "vessel" or "today"; some of the questions 400 include the token "temperature" of "today" but not "vessel", and some of the questions 400 include the token "vessel" but not "temperature" or "today". As such, since a determination has been made that Token A (e.g., that describes the noun "vessel") is the most useful (e.g., based on a track record of what noun token is the most useful when looking for an answer to a particular type of question), then DNN 424 is trained to give Token A ("vessel") the highest value when evaluating questions 400. DNN 424 is trained to give Token B ("temperature") a lower value when evaluating questions 400. DNN 424 is trained to give Token C ("today") an even lower value when evaluating questions 400.

As such, when the corpus 401 is subsequently input into the input layer 403, the DNN 424 has been trained to recognize certain passages from the corpus 401 as being related to the various tokens, and ranks that answers A-D having the answer labels 402 accordingly.

As shown in FIG. 4, the electronic neurons in DNN 424 are arranged in layers, known as an input layer 403, hidden layers 405, and an output layer 407. The input layer 403 includes neurons/nodes that take input data, and send it to a series of hidden layers of neurons (e.g., hidden layers 405), in which neurons from one layer in the hidden layers are interconnected with all neurons in a next layer in the hidden layers 405. The final layer in the hidden layers 405 then outputs a computational result to the output layer 407, which is often a single node for holding vector information. In an embodiment of the present invention, each neuron in the output layer 407 is associated with a particular answer label from answer labels 402, as shown in FIG. 4.

As just mentioned, each node in the depicted DNN 424 represents an electronic neuron, such as the depicted neuron 409. As shown in block 411, each neuron (including neuron 409) includes at least four features: a mathematical function, an output value, a weight, and a bias value.

The mathematical function is a mathematic formula for processing data from one or more upstream neurons. For example, assume that one or more of the neurons depicted in the middle hidden layers 405 send data values to neuron 409. Neuron 409 then processes these data values by executing the mathematical function shown in block 411, in order to create one or more output values, which are then sent to another neuron, such as another neuron within the hidden layers 405 or a neuron in the output layer 407. Each neuron also has a weight that is specific for that neuron and/or for other connected neurons. Furthermore, the output value(s) are added to bias value(s), which increase or decrease the output value, allowing the DNN 424 to be further "fine-tuned".

For example, assume that neuron 413 is sending the results of its analysis of a piece of data to neuron 409. Neuron 409 has a first weight that defines how important data coming specifically from neuron 413 is. If the data is important, then data coming from neuron 413 is weighted heavily, and/or increased by the bias value, thus causing the mathematical function (s) within neuron 409 to generate a higher output, which will have a heavier impact on neurons in the output layer 407. Similarly, if neuron 413 has been determined to be significant to the operations of neuron 409, then the weight in neuron 413 will be increased, such that neuron 409 receives a higher value for the output of the mathematical function in the neuron 413. Alternatively, the output of neuron 409 can be minimized by decreasing the weight and/or bias used to affect the output of neuron 409. These weights/biases are adjustable for one, some, or all of the neurons in the DNN 424, such that a reliable output will result from output layer 407. Such adjustments are alternatively performed manually or automatically.

When manually adjusted, the weights and/or biases are adjusted by the user in a repeated manner until the output from output layer 407 matches expectations. For example, assume that input layer 403 receives inputs from Questions 400 that ask for information about a "vessel", "temperature", and "today". If DNN 424 has been properly trained (by manually adjusting the mathematical function(s), output value(s), weight(s), and biases in one or more of the electronic neurons within DNN 424) to output a correct output vector (e.g., a 3-tuple output vector of 0.9, 0.2, and 0.1) to the output layer 407, then the neuron 404 for Answer A (e.g., related to a "vessel") has the highest value (0.9). Furthermore, the DNN 424, when properly trained, gives a value of 0.2 to neuron 406, indicating that Answer B (e.g., related to "temperature") is an insignificant token label for these types of questions 400. Furthermore, the DNN 424, when properly trained, gives a value of 0.1 to neuron 408, indicating that Answer C (e.g., related to "today") is an insignificant token label for these types of questions 400.

When automatically adjusted, the weights (and/or mathematical functions) are adjusted using "back propagation", in which weight values of the neurons are adjusted by using a "gradient descent" method that determines which direction each weight value should be adjusted to. For example, if the output from neuron 404 is just 0.5 and the output from neuron 406 is also 0.5, but the output from the neuron 404 (which is associated with Token A, such as "vessel") should be higher than any other neuron from the output layer 407, then the output from neuron 404 is manually changed to a high value (e.g., 0.9) and the output of neuron 406 is changed to 0.2 or smaller, and the output of neuron 408 is changed to 0.1 or smaller. The back propagation gradient descent process moves the weight and/or bias in each neuron in a certain direction until the output from output layer 407 improves (e.g., gets closer to outputting a highest value to neuron 404, thus indicating that the Token A is the most useful type of token to use when evaluating questions 400 and finding their answers from a corpus).

Thus, in the example presented above regarding the question "What countries border France?", Answer A would include data from the Passage 1 described above ("There are a number of countries that share fruitful trade relationships with the United States that border France."). Answer B includes data from Passage 2 described above ("Germany is a nice place to visit that borders France." Answer C includes data from Passage 3 described above ("Belgium is a nice country next to France."). Answer D (which receives its information from output node 410) includes data from Passage 4 described above ("Spain is by France.").

As indicated in FIG. 4, and as consistent with the rankings based on features of Passages 1-4 (and thus Answers A-D), Answers B-D are ranked lower than Answer A (even though Answer A, for reasons described above, is actually wrong). As such, a trained DNN is used to merge the lower ranked passages/answers, as shown in FIG. 5. In one embodiment of the present invention, the trained DNN 524 shown in FIG. 5 is the same DNN 424 as shown in FIG. 4. In another embodiment of the present invention, the trained DNN 524 shown in FIG. 5 is a different DNN than the DNN 424 as shown in FIG. 4.

With reference now to FIG. 5, assume that trained DNN 524 is being trained to recognize lower ranked answers (e.g., Answers B-D described in FIG. 4) that have a combination of features that outnumber an originally higher-ranked answer (e.g., Answer A described in FIG. 4). That is, the answers 500 (e.g., a combination of Answers A-D shown in FIG. 4) include not only text data from different passages in the corpus, but also the matching passage context feature indicia vectors 206 shown in FIG. 2. The trained DNN 524 thus merges one or more of these lower ranked answers (that when combined have more different features related to the question than the single original highest ranked answer) into a merged answer 2. By using manual and/or automatic back propagation techniques described above, when answers 500 from a corpus source (e.g., public documents server 352 shown in FIG. 3) are input into trained DNN 524, the answer that best fits (i.e., has the highest rating) when output from the trained DNN 524 (e.g., the merged answer 2 that merged data from Passages 2-4; e.g., Answers B-D shown in FIG. 4) is now ranked higher than the Answer 1 (analogous to Answer A shown in FIG. 4) in the group of answer labels 502.

The trained deep neural network 524 is now able to answer question 501, which has similar features as the questions 400 used to train the DNN 424, to produce a merged answer 2, using text from the answers 500 that are used by the trained DNN 524 to create the merged answer 2.

Figure 6:
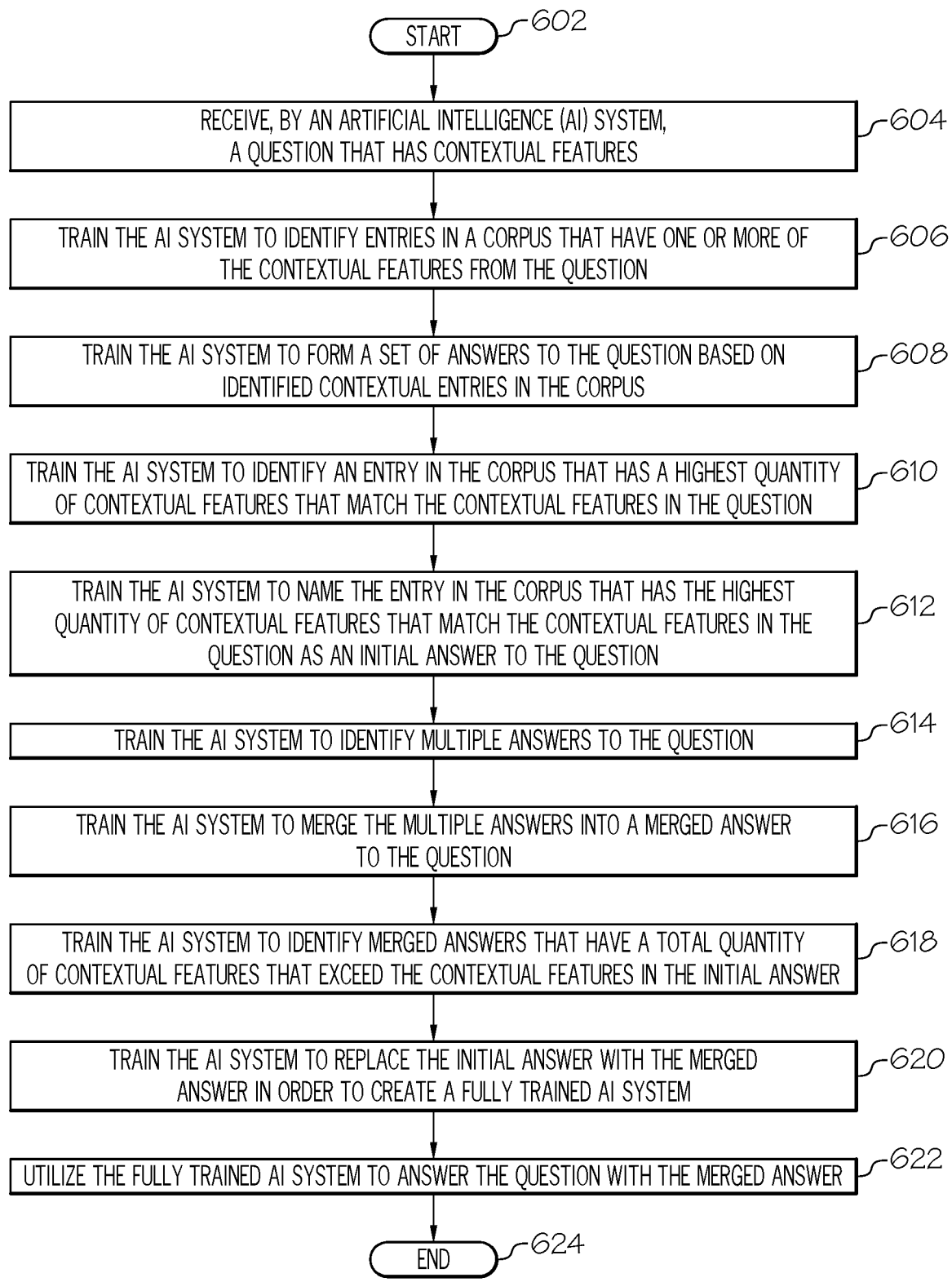
FIG. 6 is a high-level flow chart of one or more steps performed in accordance with one or more embodiments of the present invention.

With reference now to FIG. 6, a high-level flow chart of one or more embodiments of the present invention is presented.

After initiator block 602, an artificial intelligence (AI) system (e.g., DNN 424 shown in FIG. 4 and/or trained DNN 524 shown in FIG. 5) receives a question (e.g., one or the questions 400 shown in FIG. 4), as described in block 604 in FIG. 6. As described above, the question has contextual features, such as n-grams, cosine similarities, etc.

As described in block 606, the AI system is trained (manually, or autonomously using back propagation, etc. as described above), to identify entries in a corpus that have one or more of the contextual features that are found in the question. That is, the AI system finds passages/documents/etc. that have similar terms, relationships, etc. (features) as those in the question.

As described in block 608, the AI system is further trained (manually or autonomously) to form a set of answers to the question based on identified contextual entries in the corpus (see FIG. 4).

As described in block 610, the AI system is further trained (manually or autonomously) to identify an entry in the corpus that has a highest quantity of contextual features that match the contextual features in the question (e.g., Answer A in FIG. 4).

As described in block 612, the AI system is further trained (manually or autonomously) to name the entry in the corpus that has the highest quantity of contextual features that match the contextual features in the question (e.g., Answer A shown in FIG. 4) as an initial answer to the question.

As described in block 614, the AI system is further trained (manually or autonomously) to identify multiple answers (e.g., Answers B-D in FIG. 4) to the question, where the multiple answers are derived from the corpus, where the multiple answers exclude the initial answer (Answer A), and where each of the multiple answers has fewer contextual features that match the contextual features in the question than the initial answer (see FIG. 2, which shows context feature indicia vectors for answers that are analogous to Answers A-D shown in FIG. 4).

As described in block 616, the AI system is further trained (manually or autonomously) to merge the multiple answers (e.g., Answers B-D) into a merged answer (e.g., merged answer 2 shown in FIG. 5) to the question.

As described in block 618, the AI system is further trained (manually or autonomously) to identify merged answers that have a total quantity of contextual features that exceed the contextual features in the initial answer, as described in the description of FIG. 2.

As described in block 620, the AI system is further trained (manually or autonomously) to replace the initial answer (Answer A, depicted in FIG. 5 as Answer 1) with the merged answer (merged Answer 2 in FIG. 5) in order to create a fully trained AI system (e.g., trained deep neural network 524 shown in FIG. 5).

As described in block 622, the fully trained AI system is then utilized to answer the question with the merged answer. That is, the question 501 is now answered by the trained deep neural network 524, as described above.

The flow chart ends at terminator block 624.

In an embodiment of the present invention, the features in the question are n-grams of specific text, as described above.

In an embodiment of the present invention, the features in the question are specific parts of speech, as described above.

In an embodiment of the present invention, the features in the question are from a group of features consisting of a term frequency-inverse document frequency (TF-IDF) feature, a cosine similarity feature, a Jaccard similarity feature, and a Levenshtein distance feature, as described above.

In an embodiment of the present invention, the method further comprises the fully trained AI system utilizing the merged answer to the question to automatically control a physical device. That is, assume that the neural network 324 shown in FIG. 3 is the trained DNN 524 shown in FIG. 5. As such, once the trained DNN 524 develops the merged answer 2 about a physical device (e.g., pump 359), it will adjust the operation of that device/pump.

In an embodiment of the present invention, the fully trained AI system is a trained deep neural network (DNN), as described in FIG. 5.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
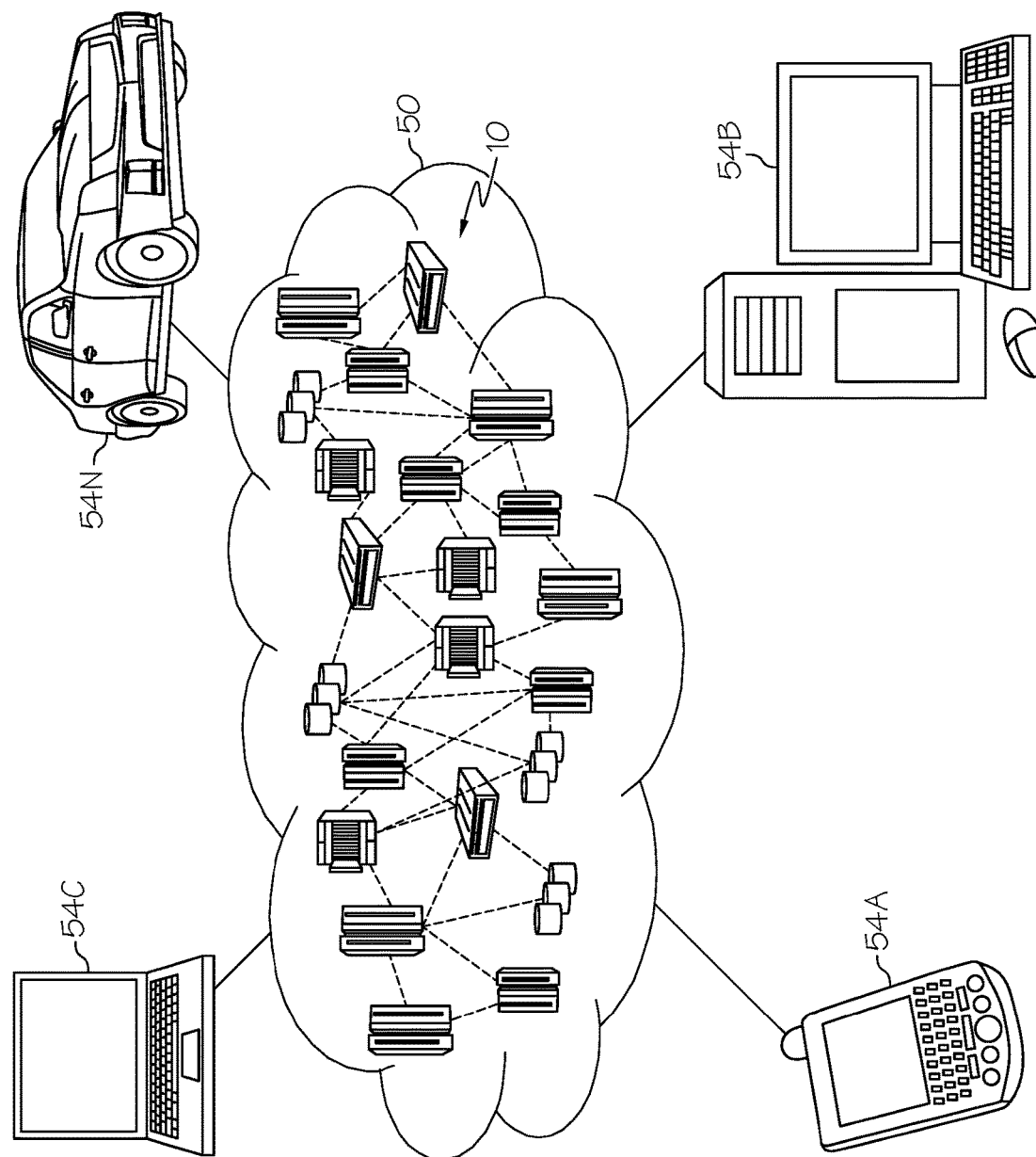
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and artificial intelligence training and utilization processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   receiving, by an artificial intelligence (AI) system, a question that has contextual features;
   training the AI system to identify entries in a corpus that have one or more of the contextual features from the question;
   further training the AI system to identify multiple answers to the question, wherein the multiple answers are derived from the corpus;
   further training the AI system to merge the multiple answers into a merged answer to the question in order to create a fully trained AI system;
   further training the AI system to name an entry in the corpus that has a highest quantity of contextual features that match the contextual features in the question as an initial answer to the question;
   further training the AI system to identify merged answers that have a total quantity of contextual features that exceed the contextual features in the initial answer; and
   utilizing the fully trained AI system to answer the question with the merged answer.

2. The method of claim 1, further comprising:
   further training the AI system to identify the entry in the corpus that has the highest quantity of contextual features that match the contextual features in the question;
   and
   further training the AI system to replace the initial answer with the merged answer in order to create a fully trained AI system.

3. The method of claim 2, wherein the multiple answers exclude the initial answer, and wherein each of the multiple answers has fewer contextual features that match the contextual features in the question than the initial answer.

4. The method of claim 1, wherein the contextual features in the question are from a group of features consisting of n-gram features, parts of speech features, a term frequency—inverse document frequency (TF-IDF) feature, a cosine similarity feature, a Jaccard similarity feature, and a Levenshtein distance feature.

5. The method of claim 1, further comprising:
   utilizing, by the fully trained AI system, the merged answer to the question to automatically control a physical device.

6. The method of claim 1, wherein the fully trained AI system is a trained deep neural network (DNN).

7. A computer program product for training an artificial intelligence (AI) system to answer a question with a merged answer, the computer program product comprising a non-transitory computer readable storage medium having program code embodied therewith, and wherein the program code is readable and executable by a processor to perform a method comprising:
   receiving, by an artificial intelligence (AI) system, a question that has contextual features;
   training the AI system to identify entries in a corpus that have one or more of the contextual features from the question;
   further training the AI system to identify multiple answers to the question, wherein the multiple answers are derived from the corpus;
   further training the AI system to merge the multiple answers into a merged answer to the question in order to create a fully trained AI system;
   further training the AI system to name an entry in the corpus that has a highest quantity of contextual features that match the contextual features in the question as an initial answer to the question;
   further training the AI system to identify merged answers that have a total quantity of contextual features that exceed the contextual features in the initial answer; and
   utilizing the fully trained AI system to answer the question with the merged answer.

8. The computer program product of claim 7, wherein the method further comprises:
   further training the AI system to identify the entry in the corpus that has the highest quantity of contextual features that match the contextual features in the question;
   and
   further training the AI system to replace the initial answer with the merged answer in order to create a fully trained AI system.

9. The computer program product of claim 8, wherein the multiple answers exclude the initial answer, and wherein each of the multiple answers has fewer contextual features that match the contextual features in the question than the initial answer.

10. The computer program product of claim 7, wherein the contextual features in the question are from a group of features consisting of n-gram features, parts of speech features, a term frequency—inverse document frequency (TF-IDF) feature, a cosine similarity feature, a Jaccard similarity feature, and a Levenshtein distance feature.

11. The computer program product of claim 7, wherein the method further comprises:
   utilizing, by the fully trained AI system, the merged answer to the question to automatically control a physical device.

12. The computer program product of claim 7, wherein the fully trained AI system is a trained deep neural network (DNN).

13. The computer program product of claim 7, wherein the program code is provided as a service in a cloud environment.

14. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:
   receiving, by an artificial intelligence (AI) system, a question that has contextual features;

training the AI system to identify entries in a corpus that have one or more of the contextual features from the question;

further training the AI system to identify multiple answers to the question, wherein the multiple answers are derived from the corpus;

further training the AI system to merge the multiple answers into a merged answer to the question in order to create a fully trained AI system;

further training the AI system to name an entry in the corpus that has a highest quantity of contextual features that match the contextual features in the question as an initial answer to the question;

further training the AI system to identify merged answers that have a total quantity of contextual features that exceed the contextual features in the initial answer; and utilizing the fully trained AI system to answer the question with the merged answer.

15. The computer system of claim 14, wherein the method further comprises:

further training the AI system to identify the entry in the corpus that has the highest quantity of contextual features that match the contextual features in the question;

and further training the AI system to replace the initial answer with the merged answer in order to create a fully trained AI system.

16. The computer system of claim 15, wherein the multiple answers exclude the initial answer, and wherein each of the multiple answers has fewer contextual features that match the contextual features in the question than the initial answer.

17. The computer system of claim 14, wherein the contextual features in the question are from a group of features consisting of n-gram features, parts of speech features, a term frequency—inverse document frequency (TF-IDF) feature, a cosine similarity feature, a Jaccard similarity feature, and a Levenshtein distance feature.

18. The computer system of claim 14, wherein the method further comprises:

utilizing, by the fully trained AI system, the merged answer to the question to automatically control a physical device.

19. The computer system of claim 14, wherein the fully trained AI system is a trained deep neural network (DNN).

20. The computer system of claim 14, wherein the stored program instructions are provided as a service in a cloud environment.

* * * * *